(12) United States Patent
Norrman et al.

(10) Patent No.: US 8,953,793 B2
(45) Date of Patent: *Feb. 10, 2015

(54) CRYPTOGRAPHIC KEY GENERATION

(71) Applicant: Telefonaktiebolaget L M Ericsson (publ), Stockholm (SE)

(72) Inventors: Karl Norrman, Stockholm (SE); Mats Näslund, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/674,226

(22) Filed: Nov. 12, 2012

(65) Prior Publication Data

US 2013/0156182 A1 Jun. 20, 2013

Related U.S. Application Data

(63) Continuation of application No. 12/996,214, filed as application No. PCT/EP2008/005960 on Jul. 21, 2008, now Pat. No. 8,340,288.

(60) Provisional application No. 61/059,386, filed on Jun. 6, 2008.

(51) Int. Cl.
*H04L 29/06* (2006.01)
*H04W 12/06* (2009.01)
(Continued)

(52) U.S. Cl.
CPC .............. *H04W 12/06* (2013.01); *H04W 12/04* (2013.01); *H04L 2463/061* (2013.01); *H04L 9/0861* (2013.01)
USPC .......................................................... 380/44

(58) Field of Classification Search
CPC .................. H04W 12/04; H04W 12/06; H04L 2463/061; H04L 9/0861

USPC ........................................................... 380/44
See application file for complete search history.

(56) References Cited

U.S. PATENT DOCUMENTS 7,131,006 B1 10/2006 Carroll
7,613,299 B2 11/2009 Carroll
(Continued)

FOREIGN PATENT DOCUMENTS

JP 2006518121 A 8/2006
JP 2008042715 A 2/2008
(Continued)

OTHER PUBLICATIONS

Siemens, "Anonymity key computation during re-synchronisation", Change Request for 3G TS 33.105 version 3.4.0 (Release 1999), 3GPP TSG SA WG 3 (Security) meeting #15, Washington (USA), Document S3-000613, pp. 1-11, Sep. 12, 2000, [Retrieved on Apr. 2, 2013], Retrieved from Internet: http://www.3gpp.org/ftp/tsg_sa/WG3_Security/TSGS3_15_Washington/Docs/PDF/S3-000613.pdf.

(Continued)

*Primary Examiner* — Lisa Lewis
(74) *Attorney, Agent, or Firm* — Coats & Bennett, PLLC

(57) ABSTRACT

A technique for generating a cryptographic key is provided. The technique is particularly useful for protecting the communication between two entities cooperatively running a distributed security operation. The technique comprises providing at least two parameters, the first parameter comprising or deriving from some cryptographic keys which have been computed by the first entity by running the security operation; and the second parameter comprising or deriving from a token, where the token comprises an exclusive OR of a sequence number (SQN) and an Anonymity Key (AK). A key derivation function is applied to the provided parameters to generate the desired cryptographic key.

22 Claims, 5 Drawing Sheets

(51) Int. Cl.
*H04W 12/04* (2009.01)
*H04L 9/08* (2006.01)

(56) References Cited

U.S. PATENT DOCUMENTS

| | | |
|---|---|---|
| 7,676,041 B2 | 3/2010 | Horn et al. |
| 2003/0053629 A1 | 3/2003 | Knapen |
| 2006/0046690 A1 | 3/2006 | Rose et al. |
| 2006/0159031 A1 | 7/2006 | Vialen et al. |
| 2006/0171541 A1 | 8/2006 | Horn et al. |
| 2007/0271458 A1 | 11/2007 | Bosch et al. |
| 2008/0032669 A1 | 2/2008 | Carroll |
| 2008/0052533 A1 | 2/2008 | Iida et al. |
| 2008/0310622 A1 | 12/2008 | Drehmel et al. |
| 2010/0177897 A1 | 7/2010 | Mildth |
| 2011/0045799 A1 | 2/2011 | Cofta |

FOREIGN PATENT DOCUMENTS

| | | |
|---|---|---|
| JP | 2008512068 A | 4/2008 |
| WO | 2005032201 A1 | 4/2005 |
| WO | 2006113189 A2 | 10/2006 |
| WO | 2007062689 A1 | 6/2007 |
| WO | 2007062882 A2 | 6/2007 |
| WO | 2007085779 A1 | 8/2007 |
| WO | 2008054320 A2 | 5/2008 |

OTHER PUBLICATIONS

3rd Generation Partnership Project, "Technical Specification Group Services and System Aspects; Rationale and track of security decisions on Long Term Evolved (LTE) RAN/3GPP System Architecture Evolution (SAE) (Release 8)", 3GPP TR 33.821 V0.1.0, Feb. 1, 2007, pp. 1-81, XP 002445696, 3GPP, France.

Biham, E. et al., "A Related-Key Rectangle Attack on the Full Kasumi", Asiacrypt 2005, 11th International Conference on the Theory and Application of Cryptology and Information Security, Chennai, India, Dec. 4, 2005, pp. 1-19, International Association for Cryptilogic Research, [Retrieved on Apr. 2, 2013], Retrieved from Internet: http://www.iacr.org/archive/asiacrypt2005/440/440.pdf.

Cheung, H., "The Feds can own your WLAN too", Online Article, SmallNetBuilder, Mar. 31, 2005, pp. 1-5, [Retrieved Apr. 2, 2013], Retrieved from Internet: http://www.smallnetbuilder.com/wireless/wireless-features/24251-thefedscanownyourlantoo.

3rd Generation Partnership Project, "Technical Specification Group Services and System Aspects; Rationale and track of security decisions in Long Term Evolved (LTE) RAN / 3GPP System Architecture Evolution (SAE) (Release 8)", 3GPP TR 33.821 V0.8.0, Apr. 1, 2008, pp. 1-125, 3GPP, France.

3rd Generation Partnership Project, "Technical Specification Group Services and System Aspects; Rationale and track of security decisions in Long Term Evolved (LTE) RAN / 3GPP System Architecture Evolution (SAE) (Release 8)", 3GPP TR 33.821 V0.3.0, May 1, 2007, pp. 1-84, 3GPP, France.

3rd Generation Partnership Project, Technical Specification Group Services and System Aspects, 3G Security, Security architecture, Jun. 2004, 3GPP TS 33.102 V54.0 (Release 5).

3rd Generation Partnership Project, Technical Specification Group Services and System Aspects, 3G Security, Security architecture, Dec. 2006, 3GPP TS 33.102 V7.1.0 (Release 7).

3rd Generation Partnership Project, Technical Specification Group Services and System Aspects, 3GPP System Architecture Evolution, Security architecture, Apr. 2008, 3GPP TS 33.401 V1.1.0 (Release 8).

CRYPTOGRAPHIC KEY GENERATION

RELATED APPLICATIONS

This application is a continuation of U.S. patent application Ser. No. 12/996,214 filed Dec. 3, 2010, which was a U.S. National Stage application of International Patent App. No. PCT/EP2008/005960 filed Jul. 21, 2008, which in turn claimed priority from U.S. Provisional App. No. 61/059,386 filed Jun. 6, 2008, and this application claims priority to and expressly incorporates herein by reference in their entirety all such applications.

TECHNICAL FIELD

The present invention generally relates to a technique for generating cryptographic keys. Particularly, the invention relates to a cryptographic key generation technique that provides a high-level of security.

BACKGROUND

The Authentication and Key Agreement protocol (AKA) is a challenge-response based protocol that uses symmetric cryptography. The main goals of AKA include mutual authentication by two entities communicating with each other and establishment of cryptographic keys for protecting the communication exchanged in-between. A variant of AKA is the UMTS AKA, included in the security architecture standardized by 3GPP for 3G mobile communication networks in the Technical Specification 3G TS 33.102.

The basic concept of UMTS AKA is shown in FIG. 1. Referring to this figure, UMTS AKA protocol is run between a user equipment (UE) and a network entity (NE). The network entity initiates the AKA by sending a user authentication request to the UE. Along with the request, a random challenge, or random code (RAND), and an Authentication Token (AUTN) are sent to the UE. Upon receipt of the RAND and the AUTN, the UE, among other things, computes a Cipher Key (CK) and an Integrity Key (IK) and then uses them for ciphering and integrity functions.

The 3GPP is also undertaking the standardization of so-called "beyond-3G" communication networks. System Architecture Evolution (SAE) and Long Term Evaluation (LTE) are two closely-related aspects of the beyond-3G network. Compared with conventional 3G networks, a network based on SAE/LTE may impose higher and/or more security requirements. For instance, more cryptographic keys for securing the communication at different levels may be needed. The 3GPP has, in another standard-related document, 3GPP TR 33.821, recommended a key hierarchy for deriving more cryptographic keys for use in SAE/LTE.

FIG. 2 shows this key hierarchy. At the very top of the hierarchy is a key K, a long-term cryptographic key shared between the Universal Subscriber Identity Module (USIM of the UE and the Authentication Center (AuC) residing in the network. One level down is a pair of cryptographic keys CK and IK which are derived by the UE, particularly by the USIM thereof, in a same or similar manner as the UMTS AKA operation mentioned above. Further down in the hierarchy is a key $K_{ASME}$ which is derived by the UE from CK, IK, and, if necessary, some other parameters. Once derived, $K_{ASME}$ is transferred from AuC to the access network, particularly to the Access Securing Management Entity (ASME) of the SAE/LTE network, and then shared between the UE and the network. When the access network is based on LTE technology, the ASME's functionalities are handled by a Mobility Management Entity (MME).

The key $K_{ASME}$, and the keys "below" it in the hierarchy, may be derived by applying a certain cryptographic function. For instance, $$K_{ASME}=KDF(CK\|IK, 0x02\|PLMN\_ID\|<\text{other\_parameter}>)$$

where KDF is based on a Generic Bootstrapping Architecture (GBA) key derivation function (KDF). One GBA KDF is specified in 3G TS 33.220.

The GBA KDF may make use of cryptographic hash functions such as the Secure Hash Algorithm (SHA) hash functions. Among many SHA hash-functions, SHA-256 is a highly secure variant since it is considered collision resistant and acts like a pseudo-random function. As its name suggests, SHA-256 is a Secure Hash Algorithm hash function with a digest (output) length of 256 bits. The PLMN_ID is an identifier of the network serving the UE.

It has been realized that, in order to achieve a high-level of security, it is not sufficient to base the GBA KDF function mainly on CK and IK only. The rationale for this is the risk that a given UE might get the same CK twice, or two different UEs may get the same CK. In such cases, the "uniqueness" of the inputs to the KDF is undermined, and a collision between different UEs (using the same $K_{ASME}$) may occur.

As a general remark, while it is certain that KDF(x) produces the same key as KDF(y) if x=y, the converse may not always hold. That is, even if x≠y, it may still happen that KDF(x)=KDF(y). However, this is an unlikely event since the KDF is recommended to be based on SHA-256 which, as mentioned, has been designed to be collision resistant. Thus, for the technique described herein, it can be safely assumed that KDF(x)=KDF(y) if and only if x=y. This assumption allows the technique described herein to be focused on assuring "uniqueness" of the inputs to the KDF.

The standardizing body of the GBA KDF specification (ETSI/SAGE, the Special Algorithm Group of Experts) has noted the above problem and recommended including the UE's Private User Identity (IMPI) in <other_parameter> to avoid collisions between different UEs. As a further recommendation, a random code such as the RAND may also be included in <other_parameter>. This is described in a liaison statement from ETSI/SAGE to 3GPP SA3 (in 3GPP document number S3-030219).

However, it has been found that the above recommendations still cannot guarantee the "uniqueness" of the inputs to the KDF. This can be seen from the below analysis of the security property of the GBA KDF function and its usage in SAE/LTE for one and the same UE (e.g. one and the same IMPI).

Firstly, the following basic construction is considered:

$$KDF(CK,IMPI).$$

Since it has been assumed that IMPI=IMPI' (when the UE is fixed), this basic construction will lead to collision for two inputs (CK, IMPI), (CK',IMPI') if and only if CK=CK'.

Secondly, another construction is considered, which is closer to the actual GBA KDF:

$$KDF(CK\|IK,IMPI).$$

However, including IK into the inputs does not change the above collision property as one might believe at first. That is, KDF(CK∥IK, IMPI) will be equal to KDF(CK'∥IK', IMPI) if and only if CK=CK'. To understand why including IK would not help, it is necessary to consider how CK and IK are produced by the cryptographic algorithm executed on the UE.

A typical UE-side cryptographic algorithm is the Milenage algorithm which is shown in FIG. 9. In FIG. 9, Ek denotes the Advanced Encryption Standard (AES) algorithm, also known as the Rijndael algorithm, using key K (stored in the AuC and USIM of UE). Consider now what happens if CK=CK'. Since AES is a permutation (a one-to-one mapping), this implies that the intermediate value (occurring at the fat arrow) is a uniquely determined by the outcome of f3 which happens to be CK. But this implies that the value at the fat arrow when producing CK must be the same as the value occurring at the same place when CK' was produced. This in turn means that the values occurring as input to f4 must be the same and consequently, the same f4-values must occur. As it happens, f4 is IK. Thus it has been shown that CK=CK' if and only if IK=IK'.

Next, an "improved" construction according to the recommendation of the standardizing body (SAGE), i.e., including RAND in the inputs, is considered:

$$KDF(CK\|IK,RAND\|IMPI).$$

Assume that CK=CK' (and thus IK=IK'). It is hoped that the use of RAND will guarantee uniqueness. However, this is not true. Consider again the "relevant" part of the Milenage algorithm that produced CK and IK from RAND: As shown in FIG. 9, there is a situation in which the value at the fat arrow corresponding to RAND is the same as that corresponding to RAND'. But again, AES (Ek) is a permutation so that the inputs must also be equal, i.e. RAND=RAND'. (The fact that AES is dependent on K does not help since a fixed UE is assumed and thus the same K will occur in both cases).

In other words, it has been shown that (CK∥IK, RAND∥IMPI)=(CK'∥IK', RAND'∥IMPI) if and only if RAND=RAND'. In the SAE/LTE case, the PLMN_ID may also be included in the inputs, but since it is highly likely that the UE stays in the same network several times, this parameter PLMN_ID cannot be relied upon for the purpose of guaranteeing uniqueness.

An alternative approach to attempt to avoid collision could be to use another algorithm than AES for the cryptographic processing of the f3 and f4 algorithms. Specifically, the analysis above was based on the fact that AES is a permutation. It would therefore be possible to use a non-permutation (many-to-one mapping) instead of AES. This is problematic for two reasons. First of all, existing USIM's must be adapted to be suitable for the 3GPP SAE architecture. Secondly, by choosing a non-permutation function, one actually increases the probability that two outputs of e.g. f3 will collide.

The lack of uniqueness of the inputs can be a serious security issue. Since collision will occur if and only if RAND=RAND', and since RAND is 128 bits, the collision is expected to occur after about $2^{(128/2)}=2^{64}$ authentications (this is the so-called "birthday paradox"). Clearly, this is lower than the targeted security level of GBA (which is 128 bits). For LTE the case is even worse, since LTE is required to provide a security level of 256 bits. Thus, the high collision probability is a significant obstacle to providing the required security level in SAE/LTE.

SUMMARY

Accordingly, there is a need for a solution that avoids the collisions mentioned above. The solution should ideally also work with already deployed USIMs and not require replacing all USIMs.

According to a first aspect, a method for generating a cryptographic key is provided. The cryptographic key is used for, among others, protecting the communication between two entities. The method is carried out by the first entity. The method forms a part of a distributed security operation which is initiated by the second entity. The method comprises providing at least two parameters, wherein the first parameter either comprises or is derived from a set of cryptographic keys which have been computed by the first entity by running the security operation; and the second parameter either comprises or is derived from a token having a different value each time the security question operation is initiated by the second entity for the first entity (in other words, the value of the token is never the same for any two security operations); and applying a key derivation function to generate a cryptographic key based on the provided parameters.

The expression "a parameter comprises X" may mean that the variable X, in its string format, forms the parameter or a part thereof. The expression "a parameter is derived from X" may bean that the parameter is the result of applying certain functions, such as mathematical functions, to at least the variable X. Examples of the functions include, but are not limited to, arithmetic operations, logic operations, string operations, and any combination thereof. The arithmetic operation may be addition, subtraction, multiplication, etc., and any meaningful combination thereof. The logic operation may be AND, OR, Exclusive OR (xOR), NOT, etc., and any meaningful combinations thereof. The string operation may be Concatenation, Reverse, Replace, etc., and any meaningful combinations thereof. Further, the arithmetic operation, the logic operation and the string operation may be combined.

Particularly, the token mentioned above may comprise or be derived from a sequence number (SQN) indicating the number of times that the security operation has been initiated by the second entity for the first entity. With each initiation, the SQN may be incremented by the second entity. This mechanism ensures that the token has a different value for each security operation initiated.

The token can take many forms. In one case, the SQN itself may be the token. Alternatively, the token may be derived from the SQN using an algorithm involving certain mathematical operations, such as at least one of an arithmetic operation, a logic operation and a string operation. For instance, the token may comprise or be derived from an Authentication Token (AUTN) constructed by the second entity based on the SQN and delivered to the first entity. This construction and delivery may be part of the security operation.

Specifically, the token may comprise an exclusive OR of the SQN and an Anonymity Key (AK). More specifically, the token may be a concatenation of the exclusive OR of the SQN and the Anonymity Key (AK), an Authentication and Key Management Field (AMF), and a Message Authentication Code (MAC). This concatenation may be expressed as $$\text{token}=AUTN=(SQN\,xOR\,AK)\|AMF\|MAC)$$

or $$\text{token}=\text{function}(AUTN)=\text{function}((SQN\,xOR\,AK)\|AMF\|MAC)$$

The second parameter may further comprise or be derived from a random challenge, or random code (RAND). The RAND may be generated by the second entity and delivered to the first entity as part of the security operation. The second parameter may yet further comprise or be derived from an identifier of the first entity. This identifier may be a Private User Identity (IMPI) or an International Mobile Subscriber Identity (IMSI). Even further, the second parameter may comprise or be derived from an identifier of a communications network and particularly the serving network of the first entity. For example, this identifier could be a Public Land Mobile Network Identifier (PLMN_ID).

Specifically, the second parameter may comprise or be derived from a concatenation of 0x02, a PLMN_ID, a RAND, an IMPI or IMSI, and the token. This could be expressed as 0x02||PLMN_ID||RAND||IMPI||token.

When the token is the SQN itself, the above becomes

0x02||PLMN_ID||RAND||IMPI||SQN;

and when the token is the AUTN, the above becomes

0x02||PLMN_ID||RAND||IMPI||AUTN.

With respect to the first parameter used in the method, this parameter comprises or is derived from a set of cryptographic keys which have been obtained by the first entity by running the security operation. The set of cryptographic keys may comprise or be derived from a Cipher Key (CK) and an Integrity Key (IK).

The CK and IK may be the cipher key and integrity key computed by the first entity based on an AUTN and an RAND. The AUTN and the RAND may be delivered from the second entity. This computation as well as the delivery of the AUTN and the RAND may form parts of the security operation.

In one implementation, the first parameter may comprise or be derived from a concatenation of CK and IK. This may be mathematically expressed as

CK||IK

The method described herein generates a cryptographic key. This key may be shared at least by the first entity and the second entity, in any subsequent communication therebetween. In certain implementations, this key may be the $K_{ASME}$ referred to in the "key hierarchy" of FIG. 2, which may be shared by the first entity and an Access Security Management Entity (ASME) of the second entity.

The method may be extended to comprise applying one or more further key derivation functions so as to generate more cryptographic keys. Such generation is based on, or makes use of, the cryptographic key generated in the basic, unextended method described above, e.g. $K_{ASME}$.

The cryptographic keys generated by the extended method may include at least one of a set of cryptographic keys for protecting the Non-Access Stratum (NAS) traffic; a set of cryptographic keys for the protection of Radio Resource Control (RRC) traffic; a set of cryptographic keys for the protection of User Plane (UP) traffic; and an intermediate cryptographic key, such as $K_{eNB}$, for deriving cryptographic keys for protecting the RRC traffic and/or cryptographic keys for protecting the UP traffic. For an easier understanding of these keys, reference is made to FIG. 2 which illustrates the key hierarchy used in SAE/LTE.

Specifically, the set of cryptographic keys for protecting the NAS traffic may comprise a key for protecting the NAS traffic with an encryption algorithm ($K_{NASenc}$) and/or another key for protecting the NAS traffic with an integrity algorithm ($K_{NASint}$). Similarly, the set of cryptographic keys for the protection of RRC traffic may comprise a key for protecting the RRC traffic with an encryption algorithm ($K_{RRCenc}$) and/or another key for protecting the RRC traffic with an integrity algorithm ($K_{RRCint}$). Further, the set of cryptographic keys for the protection of the UP traffic may comprise a key for protecting the UP traffic with an encryption algorithm ($K_{UPenc}$).

For the technique described herein, the "first entity" may be a user equipment, such as a mobile station. The "second entity" may be an entity located within a communications network, hence a "network entity". Particularly, the second entity may be located in a SAE/LTE network.

The second entity may comprise an Authentication Center (AuC)/Home Subscriber Server (HSS) and a Mobility Management Entity (MME). The MME may be responsible for the initiation of the security operation for the first entity. The cryptographic keys generated may be generated by the AuC/HSS and be shared by the first entity and the MME. The AuC/HSS may increment the SQN, particularly each time the security operation is initiated for the first entity. Further, the AuC/HSS may also construct the AUTN based on the SQN.

The security operation referred to herein may be performed by the first and second entities in a cooperative manner. For instance, the security operation may be based on an AKA procedure, such as the UMTS AKA protocol.

The key derivation function referred to by the method may be a Generic Bootstrapping Architecture (GBA) key derivation function. A Generic Bootstrapping Architecture key derivation function may employ a Secure Hash Algorithm (SHA) hash function. In particular, a Secure Hash Algorithm hash function with a digest of a length of 256 bits (SHA-256) may be employed.

According to another aspect, a computer program product is provided. The computer program product comprises program code portions for performing the steps of the method described herein when the computer program product is executed on a computer system for a computing device. The computer program product may be stored on a computer-readable reporting medium.

In general, the solution can be practiced by means of hardware, software, or a combined hardware/software approach.

As for a hardware realization, a device adapted to generate a cryptographic key for a communications entity is provided. The device can perform a security operation, of which the generation of the cryptographic key may be a part thereof. The device comprises a first component adapted to provide at least two parameters, wherein the first parameter may comprise or be derived from a set of cryptographic keys having been computed by the communications entity by running the security operation, and the second parameter may comprise or be derived from a token having a different value each time the security operation is initiated for the communications entity. The device further comprises a second parameter component adapted to execute a key derivation function so as to generate a cryptographic key based on the provide parameters. As said above, the token may take many possible forms.

The token may comprise or be derived from a SQN indicating the number of times the security operation has been initiated for the communications entity. In one implementation, the SQN itself is the token. Alternatively, the token may be derived from the SQN using an algorithm involving at least one of the arithmetic operation, logic operation and string operation. For instance, the token may comprise or be derived from an AUTN that is constructed based on the SQN and delivered to the communications entity, wherein this construction and delivery form parts of the security operation. For instance, the token may be a concatenation of the Exclusive-OR of the SQN and an Anonymity Key (AK), an Authentication and Key Management Field (AMF), and a Message Authentication Code (MAC). Specifically, this may be expressed as token=$AUTN$=($SQN$ xOR $AK$)||$AMF$||$MAC$.

In addition to the token, the second parameter may also comprise or be derived from a RAND. The RAND may be delivered to the communications entity as part of the security operation. Further, the second parameter may comprise or be derived from an identifier of the communications entity. An example of the identifier is a Private User Identity (IMPI) of the communications entity. Even further, the second parameter may comprise or be derived from an identifier of the serving network of the communications entity. This identifier could be a Public Land Mobile Network Identifier (PLMN_ID).

A particular example of the second parameter may comprise or be derived from a concatenation of 0x02, a PLMN_ID, a RAND, an IMPI or an IMSI, and the token. For instance, the second parameter may be expressed as 0x02||$PLMN\_ID$||$RAND$||$IMPI$||token.

When the token is the SQN, the above becomes

0x02||$PLMN\_ID$||$RAND$||$IMPI$||$SQN$;

and when the token is AUTN, the above becomes

0x02||$PLMN\_ID$||$RAND$||$IMPI$||$AUTN$.

As mentioned above, the first parameter may comprise or be derived from a set of cryptographic keys. Particularly, this set of cryptographic keys may comprise a Cipher Key (CK) and an Integrity Key (IK) which have been computed by the communications entity as part of the security operation. Alternatively the set of cryptographic keys may be derived from the Cipher Key and the Integrity Key.

As a particular implementation, the first parameter may comprise or be derived from a concatenation of CK and IK, which may be expressed as $CK$||$IK$.

The device can generate not only the cryptographic key based on the provided first and second parameters, but also more cryptographic keys based on the cryptographic key generated. In doing so, the device may be adapted to apply one or more further key derivation functions so as to generate the more cryptographic keys based on the cryptographic key having been generated.

These "more cryptographic keys" may comprise at least one of a set of cryptographic keys for the protection of Non-Access Stratum (NAS) traffic, a set of cryptographic keys for the protection of Radio Resource Control (RRC) traffic, a set of cryptographic keys for the protection of User Plane (UP) traffic, and an intermediate cryptographic key $K_{eNB}$ for deriving the cryptographic keys for the protection of RRC traffic and/or the cryptographic keys for the protection of UP traffic.

The communications entity referred to above may be a user equipment, such as a mobile station, (e.g., a mobile telephone or a network card).

According to a further aspect, a user equipment comprising the device presented above is provided. The user equipment may be a mobile station.

According to yet a further aspect, a system comprising the user equipment mentioned above is provided. The system also comprises a network entity. The network entity may be used within a SAE/LTE network. The network entity may comprise an AuC/HSS and a MME. The MME may be responsible for initiating the security operation for the user equipment. The AuC/HSS may generate the cryptographic key. The cryptographic keys generated may be shared by the user equipment and the MME. The AuC/HSS may increment the SQN, particularly each time the security operation is initiated for the user equipment. Further, the AuC/HSS may also construct the AUTN based on the SQN.

BRIEF DESCRIPTION OF THE DRAWINGS

In the following, the cryptographic key generation technique will be described with reference to exemplary embodiments illustrated in the drawings, wherein.

DETAILED DESCRIPTION

In the following description, for purposes of explanation and not limitation, specific details are set forth, such as particular sequences of steps, interfaces and configurations, in order to provide a thorough understanding of the cryptographic key generation technique. It will be apparent to those skilled in the art that the technique may be practiced in other embodiments that depart from these specific details. For example, while the technique will primarily be described in context with the UMTS AKA protocol and in the SAE/LTE network environment, it will be apparent to the skilled person that the technique can also be practiced in connection with other security protocols, architectures, or environments.

Moreover, those skilled in the art will appreciate that the functions explained herein below may be implemented using software functioning in conjunction with a programmed microprocessor or general purpose computer. It will also be appreciated that while the technique is primarily described in the form of methods and devices, the technique may also be embedded in a computer program product as well as in a system comprising a computer processor and a memory coupled to the processor, wherein the memory is encoded with one or more programs that may perform the function disclosed herein.

Figure 1:
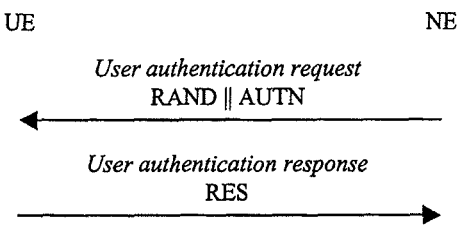
FIG. 1 is a diagram showing the basic concept of the UMTS AKA protocol.
Figure 2:
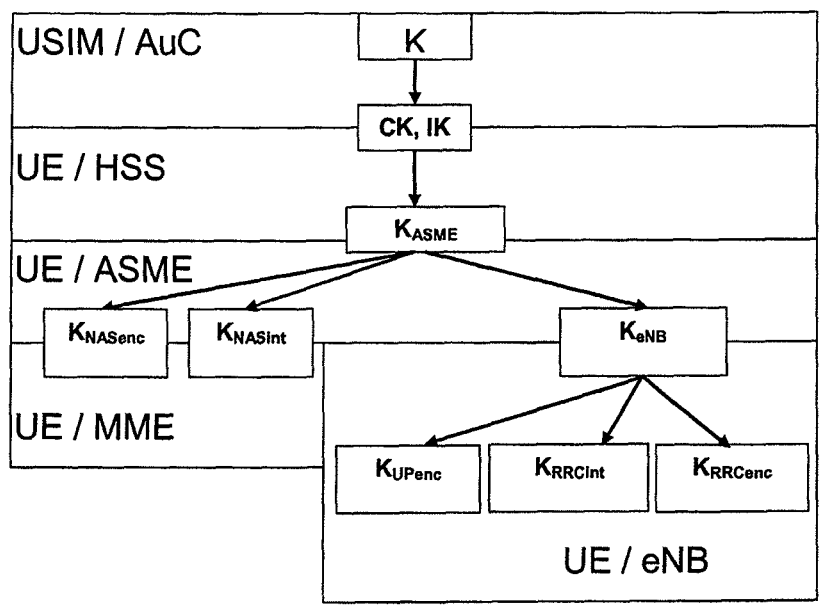
FIG. 2 is a block diagram illustrating a key hierarchy proposed for SAE/LTE system.
Figure 3:
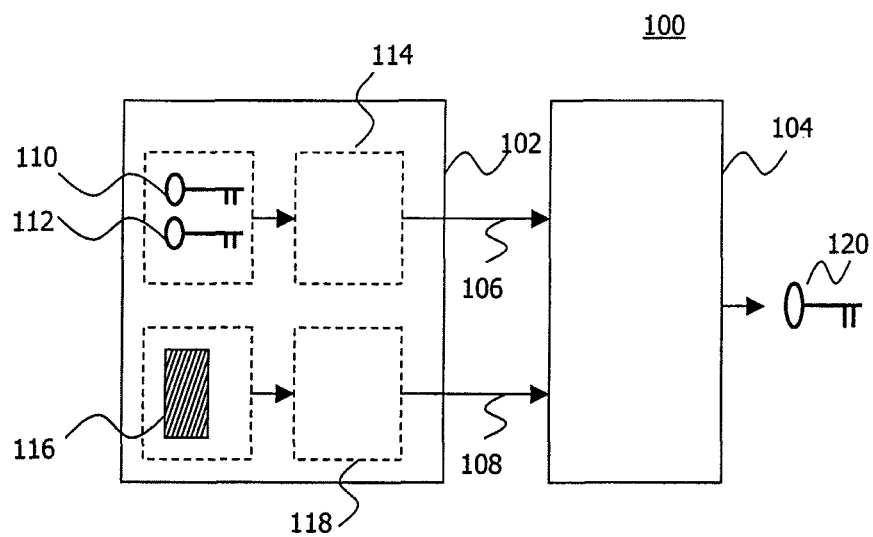
FIG. 3 is a block diagram showing a device embodiment.

FIG. 3 shows an embodiment of a device 100 adapted to generate a cryptographic key for a communications entity (not shown in FIG. 3). The communications entity is adapted to run a security operation. The device 100 comprises a first component 102 and a second component 104. The first component 102 is adapted to provide at least two parameters, figuratively shown at the arrows 106 and 108.

The first parameter 106 comprises or is derived from a set of cryptographic keys 110 and 112. (Although two keys are shown in the figure, the set of cryptographic keys may include any number of keys.) The set of cryptographic keys has been computed by the communications entity by running the security operation. The derivation of the set of cryptographic keys 110 and 112 into the first parameter 106 is figuratively shown as a block 114. The second parameter 108 comprises or is derived from a token 116. The token 116 has a different value each time the security operation is initiated for the communications entity. The derivation of the token 116 into the second parameter 108 is figuratively shown as a block 118. The second component 104 of the device 100 is adapted to run a key derivation function to generate a cryptographic key 120 based on the provided parameters 106 and 108.

Figure 4:
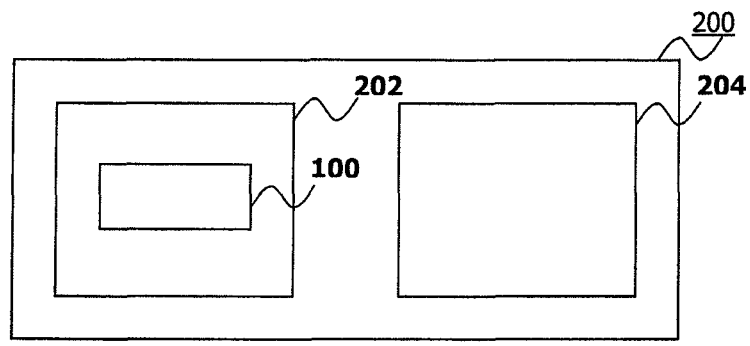
FIG. 4 is a block diagram showing a system embodiment.

Referring to FIG. 4, an embodiment of a system 200 comprising the device 100 mentioned above is shown. The device 100 may be comprised in a communications entity 202, which may be a UE, such as a mobile station. Of course, the communications entity 202 may be any suitable kind of communications entity capable of accommodating the device 100. Further, the system comprises a network entity 204, which may reside in a SAE/LTE network. The network entity 204 may comprise an AuC or HSS and a MME. It may also be another communications entity in a SAE/LTE network.

Figure 5:
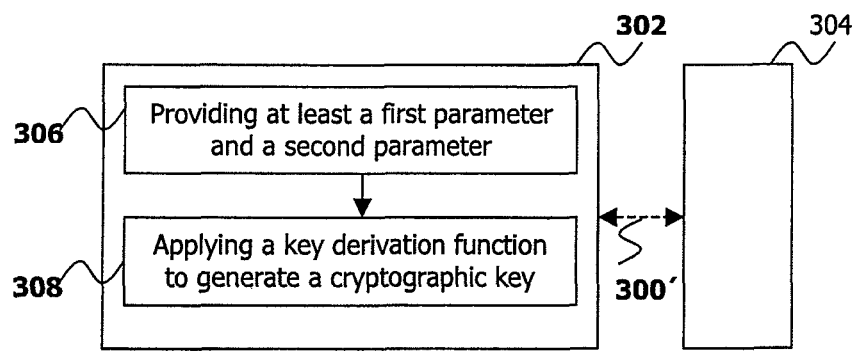
FIG. 5 is a block diagram showing a method embodiment.

Corresponding to the cryptographic key generation device 100 shown in FIGS. 3 and 4, a diagram 300 illustrating an embodiment of a method for generating a cryptographic key is shown in FIG. 5. The key generated is used for protecting the communication between two entities. The first entity 302 may correspond to the communications entity 202 as shown in FIG. 4, and the second entity 304 may correspond to the network entity 204 of FIG. 4. The first entity may be a UE. However, the embodiment is not limited to a UE-network entity scenario. Instead, it can be applied to any two communications entities in general.

The MME may be responsible for initiating the security operation for the communications entity 202. The cryptographic keys generated may be shared by the MME and the communications entity 202.

Particularly, the method embodiment is carried out by the first entity 302 as part of a security operation figuratively illustrated at the arrow 300', which is initiated by the second entity 304 (particularly by the MME thereof) for the first entity 302. The embodiment itself comprises two steps, 306 and 308. Step 306 provides at least two parameters (106 and 108 of FIG. 3). The first parameter comprises or is derived from a set of cryptographic keys (110 and 112 as shown in FIG. 3) which have been computed by the first entity by running the security operation 300'. The second parameter comprises or is derived from a token (116 as shown in FIG. 3) which has a different value each time the security operation 300' is initiated by the second entity 304 for the first entity 302. At the second step 308, a key derivation function is applied to generate a cryptographic key (120 as shown in FIG. 3) based on the provided parameters (106 and 108 as shown in FIG. 3).

Below, substantial details are given to explain the cryptographic key generation technique with a particular emphasis on how the technique can successfully avoid the key-collisions between two UEs, or more importantly, between two distinct executions of the security operation for one and the same UE.

The cryptographic key generation may be part of the UMTS AKA operation. The UMTS AKA is based on the implementation that the UE, particularly the USIM thereof, and the AuC/HSS in the UE's Home Environment (HE) share a user specific secret key K, certain message authentication functions f1, f2 and certain cryptographic key generation functions f3, f4, f5. In addition the USIM and the AuC/HSS keep track of counters, or sequence numbers $SQN_{UE}$ and $SQN_{HE}$ respectively to support network authentication. For instance, the AuC/HSS may increment the $SQN_{HE}$, particularly each time the security operation is initiated for the first entity. The UMTS AKA operation comprises a number of procedures, including Generation of Authentication Vectors (AV), and Authentication and Key Establishment.

Figure 6:
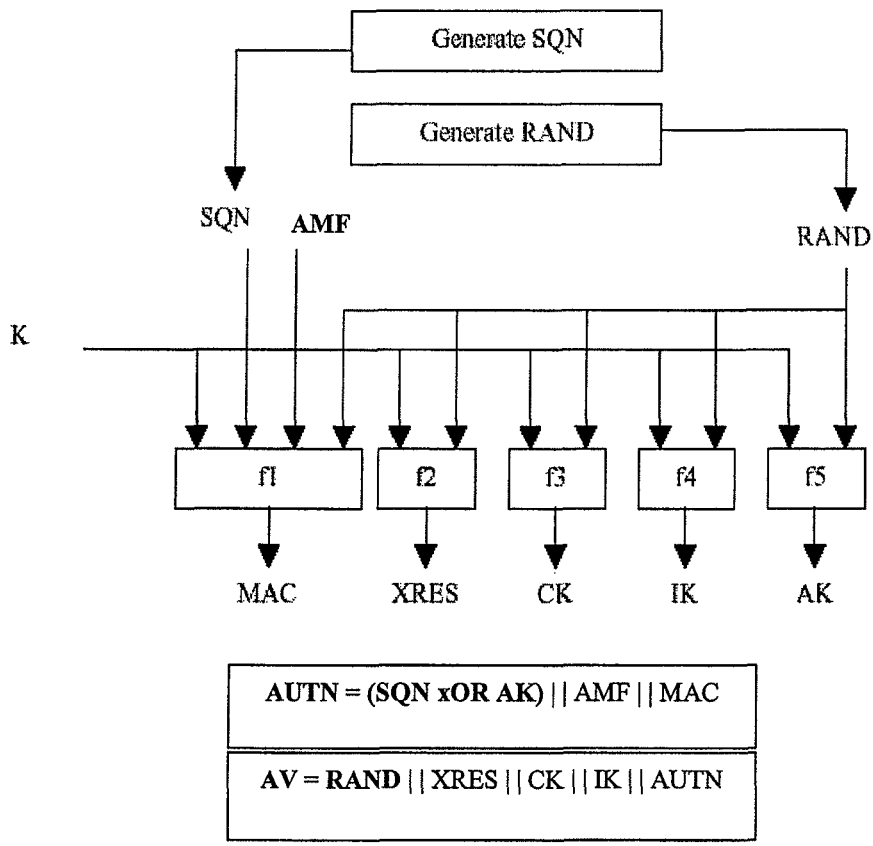
FIG. 6 is a block diagram showing a procedure of the UMTS AKS operation, Generation of an Authentication Vector by a network entity.

The purpose of the AV procedure is to provide the SN/VLR or (MME) with an array of fresh AVs from the UE's HE to perform a number of user authentications. Generation of Authentication Vectors by the HE is illustrated in FIG. 6. Referring to this figure, upon receipt of a request from the SN/VLR, the AuC/HSS sends an ordered array of n Authentication Vectors AV (1 . . . n) to the SN/VLR. Each AV comprises a random number (or random challenge) RAND, an expected response XRES, a cipher key CK, an integrity key IK and an authentication token AUTN.

The AuC/HSS starts with generating a fresh sequence number SQN and an unpredictable challenge RAND. Subsequently the following values are computed:
 a message authentication code MAC=f1 (SQN||RAND||AMF) where f1 is a message authentication function;
 an expected response XRES=f2 (RAND) where f2 is a (possibly truncated) message authentication function;
 a cipher key CK=f3 (RAND) where f3 is a key generating function;
 an integrity key IK=f4 (RAND) where f4 is a key generating function; and
 an anonymity key AK=f5 (RAND) where f5 is a key generating function.

Finally the authentication token AUTN=(SQN xOR AK)||AMF||MAC is constructed. It may be constructed by the AuC/HSS. Here, AK is an anonymity key used to conceal the SQN as the latter may expose the identity and location of the UE. The concealment of the SQN is to protect against passive attacks. Use of AK may be optional. When AK is not used, the value AK=000 . . . 0 may figuratively be used instead.

The array of AVs is sent back to the requesting SN/VLR in an authentication response. Each AV is valid for one (and only one) authentication and key agreement between the SN/VLR and the USIM.

Figure 7:
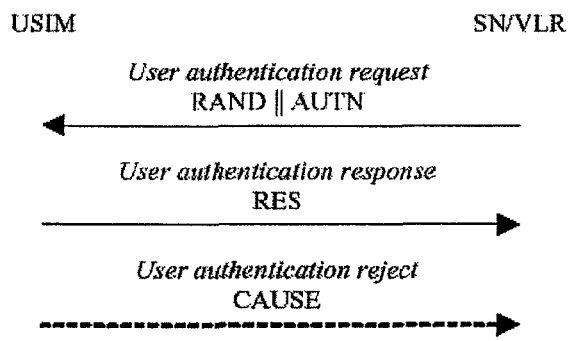
FIG. 7 is a block diagram showing another procedure of the UMTS AKA operation, Authentication and Key Establishment.

The next procedure of the UMTS AKA operation, Authentication and Key Establishment, is to mutually authenticate and establish new cipher and integrity keys between the SN/VLR and the UE. This process is illustrated in FIG. 7. Referring to this figure, when the SN/VLR initiates an authentication and key agreement, it selects the next AV from the array and sends the parameters RAND and AUTN to the UE. The USIM checks whether AUTN can be accepted and, if so, produces a response RES which is sent back to the SN/VLR. Particularly, the UE's procedures are shown in FIG. 8.

Figure 8:
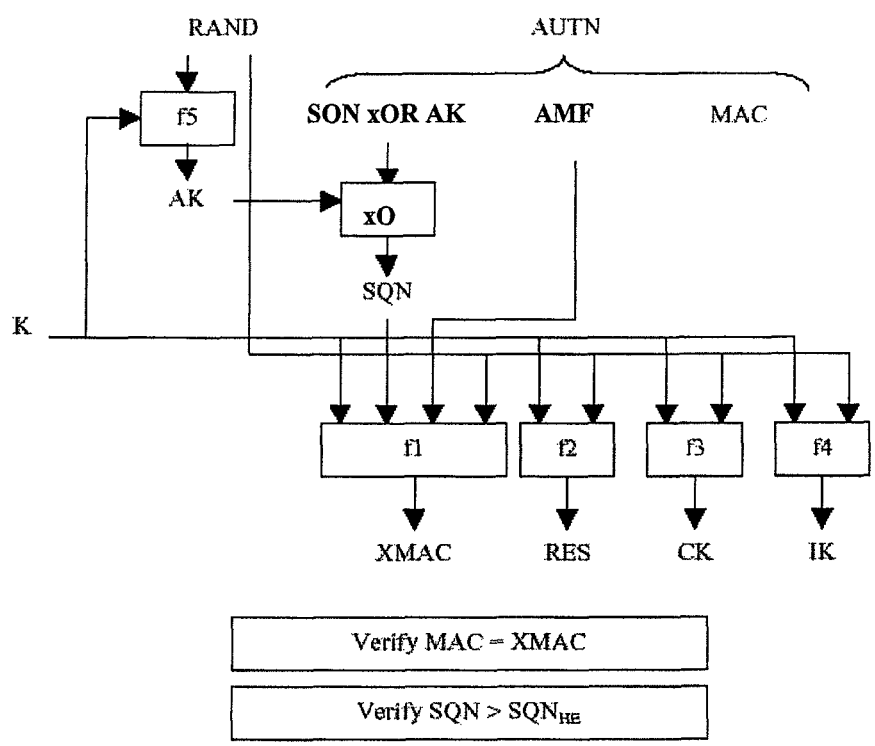
FIG. 8 is a block diagram showing the general authentication function performed by the UE as part of the UMTS AKA operation.

Referring to FIG. 8, upon receipt of RAND and AUTN the UE first computes the anonymity key AK=f5 (RAND) (or uses AK=000 . . . 0) and retrieves the sequence number SQN=(SQN xOR AK) xOR AK. Next the UE computes XMAC=f1 (SQN||RAND||AMF) and compares this with MAC which is included in AUTN. If they are different, the UE sends user authentication reject back to the SN/VLR with an indication of the cause and the UE abandons the procedure. Else, the UE verifies that the received SQN is in the correct range.

If the SQN is considered to be in the correct range, the UE computes RES=f2 (RAND) and includes this parameter in a user authentication response back to the SN/VLR. Finally the UE computes the cipher key CK=f3 (RAND) and the integrity key IK=f4 (RAND). To improve efficiency, RES, CK and IK could also be computed earlier at any time after receiving RAND. The UE may store RAND for resynchronization purposes.

Upon receipt of user authentication response the SN/VLR compares RES with the expected response XRES from the selected authentication vector. If XRES equals RES then the Authentication of the user has been accepted. The newly computed keys CK and IK will then be transferred by the USIM and the SN/VLR to the entities which perform ciphering and integrity functions.

Figure 9:
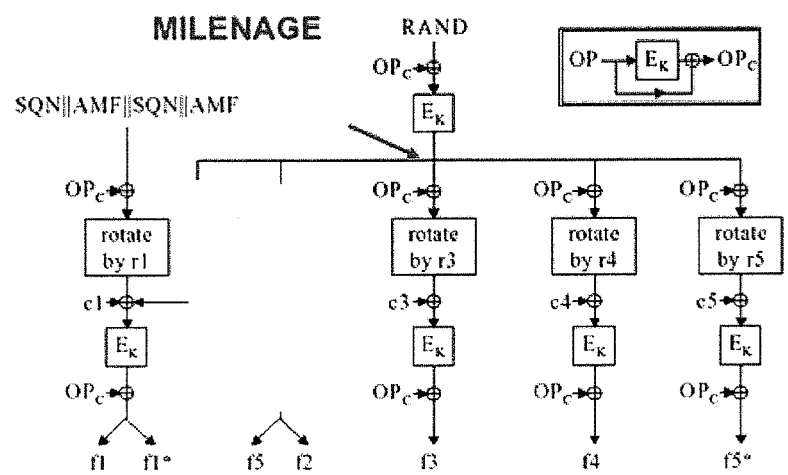
FIG. 9 is a block diagram showing a particular cryptographic algorithm for performing the above authentication function at the UE.
Figure 10:
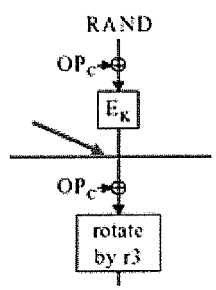
FIG. 10 is a block diagram showing a particular detail of the above cryptographic algorithm.

From the above, it can be seen that the UMTS AKA operation is based on a pair (RAND, AUTN) and AUTN comprises or is derived from a sequence number, SQN, as $$AUTN=(SQN\ xOR\ AK)\|AMF\|MAC$$

where AK is an anonymity key, which may be produced by Milenage (see FIG. 9) from output "f5" above.

The below function is a first solution to the collision problem set out above:

$$KDF(CK\|IK,RAND\|IMPI\|SQN)$$

where SQN has thus been included in the inputs. Now, even if two RANDs are the same, i.e. RAND=RAND', the fact that the SQN always increases (by e.g., one) will ensure that inputs are different, unique, or distinct.

An alternative solution is to use $$KDF(CK\|IK,RAND\|IMPI\|AUTN).$$

This solution may be simpler to implement since AUTN can be used "as is" from the AKA signaling. However, the "uniqueness" of the inputs in this case may not be obvious since $$AUTN=(SQN\ xOR\ AK)\|AMF\|MAC$$

and even if SQN≠SQN', it cannot be immediately seen that (SQN xOR AK), and SQN' xOR AK') will be distinct as AK could potentially "cancel" the differences. However, below, the distinctness of (SQN xOR AK) can be proven.

Suppose that $$(CK\|IK,RAND\|IMPI\|AUTN)=(CK'\|IK', RAND'\|IMPI\|AUTN').$$

It has already been shown that this implies CK=CK', IK=IK', and RAND=RAND'. It thus remains to be checked if it could be that AUTN=AUTN'. This checking may be translated into checking if $$(SQN\ xOR\ AK)\|AMF\|MAC=(SQN'\ xOR\ AK') \|AMF'\|MAC'.$$

Assume without loss of generality that AMF=AMF' and MAC=MAC'. Then it is only necessary to check if the following could hold:

$$SQN\ xOR\ AK=SQN'\ xOR\ AK'.$$

Recall that it is expected that RAND=RAND'. Referring to the Milenage algorithm shown in FIG. 9, this implies that AK=AK' (as they were produced from the same RANDs). Thus, it had to be that $$SQN=SQN',$$

which is a contradiction since, as already noted, SQN always "steps up" and thus SQN≠SQN'.

Thus, it is proven the second solution also guarantees the uniqueness of inputs to the KDF function.

As a general solution, instead of using SQN or AUTN to achieve the uniqueness, any token having a different value each time the UMTS AKA operation is initiated by the network for the UE is feasible. For instance, SQN xOR AK (forming part of AUTN) may be used since it (by the above analysis) has the required uniqueness property.

The cryptographic key generation technique described here above presents numerous advantages. For example, it guarantees uniqueness of KDF inputs. Hence, it successfully avoids the commissions brought about by possible identical inputs. With this technique, the cryptographic key generated shall be able to meet, for example, the high-level security requirements in SAE/LTE systems. As a further advantage, the technique can be implemented based on already deployed USIMs without requiring any USIM replacement. Another specific advantage with using AUTN rather than SQN is that the invention can be implemented in the mobile terminal (outside the USIM).

Although embodiments of the cryptographic key generation technique have been illustrated in the accompanying drawings and described in a foregoing description, it will be understood that the technique is not limited to the embodiments disclosed herein. The technique is capable of numerous re-arrangements, modifications and substitutions without departing from the scope of the invention.

What is claimed is:

1. A method of generating a cryptographic key for protecting communication between a first entity and a second entity, the method carried out by a cryptographic key generation device comprised in the first entity as part of an Authentication and Key Agreement (AKA) procedure initiated by the second entity and comprising:
   providing at least two parameters, wherein a first parameter comprises or is derived from a set of cryptographic keys computed by the first entity by running the AKA procedure, and wherein a second parameter comprises or is derived from a token, the token comprising an exclusive OR of a sequence number (SQN) and an Anonymity Key (AK); and
   applying a key derivation function to generate a cryptographic key based on the provided parameters.

2. The method of claim 1, wherein the SQN indicates the number of times the AKA procedure has been initiated by the second entity for the first entity.

3. The method of claim 1, wherein the token is a concatenation of the exclusive OR of the SQN and the Anonymity Key (AK), an Authentication and Key Management Field (AMF), and a Message Authentication Code (MAC).

4. The method of claim 1, wherein the set of cryptographic keys comprised in the first parameter or from which the first parameter is derived comprises or is derived from a Cipher Key (CK) and an Integrity Key (IK).

5. The method of claim 1, further comprising applying one or more further key derivation functions to generate more cryptographic keys based on the cryptographic key generated.

6. The method of claim 5, wherein the more cryptographic keys comprise at least one of the following:
   a set of cryptographic keys for the protection of Non Access Stratum (NAS) traffic;
   a set of cryptographic keys for the protection of Radio Resource Control (RRC) traffic;
   a set of cryptographic keys for the protection of User Plane (UP) traffic; and
   an intermediate cryptographic key (KeNS) for deriving the cryptographic keys for the protection of RRC traffic and/or the cryptographic keys for the protection of UP traffic.

7. The method of claim 1, wherein the first entity is a user equipment.

8. The method of claim 1, wherein the second entity is a network entity.

9. The method of claim 8, wherein the second entity resides in a System Architecture Evolution (SAE)/Long Term Evolution (LTE) network.

10. The method of claim 8, wherein the second entity comprises an Authentication Center (AuC)/Home Subscriber Server (HSS) and a Mobility Management Entity (MME).

11. The method of claim 1, wherein the AKA procedure is cooperatively performed by the first and second entities.

12. The method of claim 1, wherein the AKA procedure is UMTS AKA protocol.

13. The method of claim 1, wherein the combination of the at least two parameters has a different value each time the AKA procedure is initiated by the second entity for the first entity.

14. A computer program product, stored on a computer readable recording medium not including a transitory signal, and comprising computer program code portions that, when run on a computer system, cause a first entity to generate a cryptographic key for protecting communication between the first entity and a second entity, as part of an Authentication and Key Agreement (AKA) procedure initiated by the second entity the computer program code portions causing the first entity to:

provide at least two parameters, wherein a first parameter comprises or is derived from a set of cryptographic keys computed by the first entity by running the AKA procedure, and wherein a second parameter comprises or is derived from a token, the token comprising an exclusive OR of a sequence number (SQN) and an Anonymity Key (AK); and apply a key derivation function to generate a cryptographic key based on the provided parameters.

15. A device configured to generate a cryptographic key for a communications entity that is configured to run an AKA procedure, the device comprising one or more processors configured to:

provide at least two parameters, wherein a first parameter comprises or is derived from a set of cryptographic keys computed by the communications entity by running the AKA procedure, and wherein a second parameter comprises or is derived from a token, the token comprising an exclusive OR of a sequence number (SQN) and an Anonymity Key (AK); and run a key derivation function to generate a cryptographic key based on the provided parameters.

16. The device of claim 15, wherein the SQN indicates the number of times the AKA procedure has been initiated for the communications entity.

17. The device of claim 15, wherein the set of cryptographic keys comprised in the first parameter or from which the first parameter is derived comprises or is derived from a Cipher Key (CK) and an Integrity Key (IK) computed by the communications entity as part of the security operation.

18. The device of claim 15, wherein the one or more processors are further configured to apply one or more further key derivation functions to generate more cryptographic keys based on the cryptographic key generated.

19. The device of claim 15, wherein the combination of the at least two parameters has a different value each time the AKA procedure is initiated by a second entity for the communications entity.

20. A user equipment configured to run an Authentication and Key Agreement (AKA) procedure and comprising a device configured to generate a cryptographic key for the user equipment, the device comprising one or more processors configured to:

provide at least two parameters, wherein a first parameter comprises or is derived from a set of cryptographic keys computed by the user equipment by running the AKA procedure, and wherein a second parameter comprises or is derived from a token, the token comprising an exclusive OR of a sequence number (SQN) and an Anonymity Key (AK); and run a key derivation function to generate a cryptographic key based on the provided parameters.

21. A system comprising a network entity and a user equipment configured to run an Authentication and Key Agreement (AKA) procedure, the user equipment comprising a device configured to generate a cryptographic key for the user equipment, the device comprising one or more processors configured to:

provide at least two parameters, wherein a first parameter comprises or is derived from a set of cryptographic keys computed by the user equipment by running the AKA procedure, and wherein a second parameter comprises or is derived from a token, the token comprising an exclusive OR of a sequence number (SQN) and an Anonymity Key (AK); and run a key derivation function to generate a cryptographic key based on the provided parameters.

22. The system of claim 21, wherein the network entity is for use in a System Architecture Evolution (SAE)/Long Term Evolution (LTE) network.

\* \* \* \* \*